US008289186B2

(12) United States Patent
Osafune (10) Patent No.: US 8,289,186 B2
(45) Date of Patent: Oct. 16, 2012

(54) METHOD AND APPARATUS FOR AD-HOC NETWORK BROADCAST COMMUNICATION

(75) Inventor: Tatsuaki Osafune, Cannes (FR)

(73) Assignee: Hitachi, Ltd., Tokyo (JP)

( * ) Notice: Subject to any disclaimer, the term of this patent is extended or adjusted under 35 U.S.C. 154(b) by 1258 days.

(21) Appl. No.: 11/591,318

(22) Filed: Oct. 31, 2006

(65) Prior Publication Data

US 2007/0117525 A1 May 24, 2007

(30) Foreign Application Priority Data

Nov. 18, 2005 (EP) .................................. 05292447

(51) Int. Cl.
*G08G 1/16* (2006.01)

(52) U.S. Cl. ........ 340/903; 340/901; 340/902; 340/435; 340/436; 340/438; 701/301; 701/117

(58) Field of Classification Search ............. 340/426.16, 340/991–994, 901–904, 435–438; 701/301, 701/300, 93, 96
See application file for complete search history.

(56) References Cited

U.S. PATENT DOCUMENTS

| 5,548,822 | A  | * | 8/1996  | Yogo ............................... 455/68  |
| 5,589,827 | A  | * | 12/1996 | Scurati .......................... 340/901  |
| 5,926,114 | A  | * | 7/1999  | Andrews ........................ 340/909  |
| 5,999,880 | A  | * | 12/1999 | Okada et al. ................... 701/213  |
| 6,150,961 | A  | * | 11/2000 | Alewine et al. ............. 340/995.1  |
| 6,275,707 | B1 | * | 8/2001  | Reed et al. .................. 455/456.3  |
| 6,278,360 | B1 | * | 8/2001  | Yanagi ........................... 340/436  |
| 6,317,058 | B1 | * | 11/2001 | Lemelson et al. ............ 340/910  |
| 6,337,638 | B1 | * | 1/2002  | Bates et al. .................... 340/904  |
| 6,397,149 | B1 | * | 5/2002  | Hashimoto ................... 701/300  |
| 6,437,688 | B1 | * | 8/2002  | Kobayashi .................... 340/435  |
| 6,765,495 | B1 | * | 7/2004  | Dunning et al. .............. 340/903  |
| 6,813,561 | B2 | * | 11/2004 | MacNeille et al. ........... 701/213  |

(Continued)

FOREIGN PATENT DOCUMENTS

EP 1262935 A 12/2002

(Continued)

OTHER PUBLICATIONS

Kremer W. et al., "Vehicle Density and Communication Load Estimation in Mobile Radio Local Area Networks (MR-LANs)", Pioneers to the 21st Century; Denver, May 10-13, 1992.

(Continued)

*Primary Examiner* — Daniel Wu
*Assistant Examiner* — Son M Tang
(74) *Attorney, Agent, or Firm* — Kilpatrick Townsend & Stockton LLP (57) ABSTRACT

The present invention relates to a method and apparatus for reducing the number of packets in a vehicle-to-vehicle multi-hop broadcast communication. The method determines a position data comprising a position, a velocity and a direction of a receiving vehicle (1, 2, 3, 4), receives a position data comprising position, velocity and direction from sending vehicles (1, 2, 3, 4), and calculates a relative position between the receiving vehicle (1, 2, 3, 4) and the sending vehicle (1, 2, 3, 4). Next, a density of vehicles is calculated from the calculated relative positions. The position data of the receiving vehicle (1, 2, 3, 4) is periodically sent, and the time for periodically sending the position data of the receiving vehicle (1, 2, 3, 4) is set in accordance with the calculated density of vehicles.

14 Claims, 4 Drawing Sheets

U.S. PATENT DOCUMENTS

| | | | |
|---|---|---|---|
| 6,831,572 B2 * | 12/2004 | Strumolo et al. | 340/903 |
| 7,005,977 B1 * | 2/2006 | Tengler et al. | 340/457.2 |
| 7,298,289 B1 * | 11/2007 | Hoffberg | 340/903 |
| 7,382,274 B1 * | 6/2008 | Kermani et al. | 340/901 |
| 7,444,240 B2 * | 10/2008 | Macneille et al. | 701/300 |
| 7,523,000 B2 * | 4/2009 | Tengler et al. | 701/301 |
| 7,623,956 B2 * | 11/2009 | Kawaguchi | 701/117 |
| 2005/0030202 A1 | 2/2005 | Tsuboi | |

FOREIGN PATENT DOCUMENTS

| | | |
|---|---|---|
| EP | 1441321 | 7/2004 |
| EP | 1441321 A | 7/2004 |
| EP | 05292447 | 11/2005 |
| JP | 04-297000 A | 10/1992 |
| JP | 2000-90396 A | 3/2000 |
| JP | 2005-124014 | 5/2005 |
| JP | 2005-196651 A | 7/2005 |

OTHER PUBLICATIONS

International Search Report for European application EP10185165.7 (Jun. 21, 2011).

Bachir et al. "A multicast protocol in ad hoc networks inter-vehicle geocast," IEEE Proceedings of The 57th IEEE Semiannual Vehicular Technology Conference 2003, pp. 2456-2460 (2003).

Kremer et al. "Vehicle Density and Communication Load Estimation in Mobile Radio Local Area Networks (MR-LANs)," 42nd Vehicular Technology Society Conference 2:698-704 (May 1992).

Saito et al. "Inter-vehicle mobile ad-hoc communication protocol for acquiring local traffic information," IPSJ SIG Technical Report 2004:49-56 (2004).

Japan Patent Office office action for patent application JP2006-271654 dated May 10, 2011.

Japan Patent Office office action for patent application JP2006-271654 dated Aug. 2, 2011.

Japan Patent Office office action for patent application JP2006-271654 dated Dec. 20, 2011.

Japan Patent Office office action for patent application JP2010-144774 dated Sep. 20, 2011.

Japan Patent Office office action for patent application JP2010-144774 dated Dec. 20, 2011.

* cited by examiner

METHOD AND APPARATUS FOR AD-HOC NETWORK BROADCAST COMMUNICATION

CLAIM OF PRIORITY

The present application claims priority from European patent application serial EP05292447.9 filed on Nov. 18, 2005, the content of which is hereby incorporated by reference into this application.

BACKGROUND OF THE INVENTION

The present invention relates to a method and apparatus for ad-hoc network communication. More particularly, the present invention relates to a method and apparatus for vehicle-to-vehicle multi-hop broadcast communication.

Ad-hoc networks are becoming more and more popular, both in general as well as in the automotive field. This popularity may be attributed to the ad-hoc network protocols employed being fairly robust, on the one hand, and the required integrated circuit chips being both cheap and small enabling cost-effective and widespread applications.

Applications of ad-hoc networks in the automotive field and communication between vehicles in particular can be generally categorized in two types, namely safety applications and comfort applications.

Comfort applications, as the name suggests, comprise applications that aim at increasing vehicles' passengers comfort. Examples of such applications are navigation aid, indication of points of interest or Internet connection in a vehicle.

Safety applications, on the other hand, aim at increasing the safety of passengers in traffic, for instance by indicating a developing or existing traffic congestion or by enabling avoidance of collisions of vehicles. For example, one of the safety applications is disclosed in Japanese published patent application No. 2005-124014.

Ad hoc networks to be employed in these applications have to meet complex and rather stringent requirements in order to enable fast and reliable information on imminent danger. For instance, safety applications require a very short time delay to ensure the information is received in time. Also, data transmitted via the ad hoc networks should be as simple as possible in order to allow for fast transmission. Furthermore, this application requires every vehicle has to know relative positions and velocities of every other vehicle within its communication range, so that the system can give a respective warning to the driver when another vehicle is on collision course.

Conventional ad-hoc networks certified for automotive, such as Wireless Local Area Networks (WLAN), IEEE 802.11, IEEE 802.15, Dedicated Short Range Communications (DSRC) or Bluetooth typically provide a smaller communication range or a longer time delay than required by safety applications.

In addition, conventional ad-hoc networks certified for automotive of the above type only provide a limited bandwidth, such as 2 Mbps in IEEE 802.11. This bandwidth is not sufficient in safety applications, as illustrated by the following example. On a congested road with one vehicle every 10 meters on 5 lanes in each direction (10 lanes in total), if each vehicle sends out a data packet with 100 Bytes every 100 ms, the required bandwidth adds up to 3.2 Mbps, exceeding the WLAN broadcast data rate of 2 Mbps.

In Kremer W. et al: "Vehicle density and communication load estimation in mobile radio local area networks (MR-LANs)" form Pioneers to the $21^{st}$.century. Denver, May 10-13, 1992, Proceedings of the vehicular technology society conference (VTSC), New York, IEEE, US, vol.2 conf.42, 10 May 1992(1992 May 10), pages 698-704, XP010064612, ISBN 0-7803-0673-2, a method for estimating the communication bandwidth which is required for Cooperative Driving when using wireless communication is described. The estimation of the communication rate is done based on the density of vehicles over variety of road patterns and the required communication distance obtained from the distance needed to stop a car.

SUMMARY OF THE INVENTION

Accordingly, it is an object of the present invention to provide a method and apparatus for vehicle-to-vehicle multi-hop broadcast communication with enhanced communication capabilities.

It is a further object of the present invention to provide a method and apparatus to allow reliable vehicle-to-vehicle multi-hop broadcast communication.

Still further, it is an object of the present invention to provide a method and apparatus to enhance the packet flow in a vehicle-to-vehicle multi-hop broadcast communication.

These objects are achieved by the method and apparatus according to the present invention as defined by the independent claims. The dependent claims relate to preferred embodiments of the invention.

The present invention proposes a wireless communication system, such as a wireless vehicle-to-vehicle communication system, in which the number of packets can be reduced at least by two ways, namely congestion detection and efficient flooding.

Congestion detection relates to the detection of a congested road condition. When congestion on a road occurs, the number of packets which a vehicle receives and sends becomes n-times of the vehicles. This may result in a shortage of bandwidth. On the other hand, during such a congestion situation, the need for transmitting of the packet is little, as the velocity of the individual vehicle is low and the probability of severe accidents/collisions is largely reduced. Accordingly, the frequency of sending out packets can be reduced for every vehicle but the first and the last one. The last vehicle may to send out the packet to avoid being collided from behind. This results in an overall reduction of the number of packets.

Efficient flooding provides an algorithm to flood a packet through wireless network efficiently. Accordingly, the algorithm can select the nodes which can send the packet further. The algorithm can also stop retransmission of the packets when such a retransmission is not necessary.

To detect the congestion of a road, position information of all vehicles can be used by using vehicle data. The set-up of vehicle data will be described later. The condition for a congested road can be defined as follows: If the vehicle receives a predetermined number of packets from vehicles going the same direction, with a speed within a range of speed of the vehicle, if the vehicle receives the packets from at least a vehicle in front and a vehicle behind and if the speed is below a threshold, the road may be congested.

After such congestion is detected, the vehicle calculates the density of the vehicles. Based on the density, the time/period for retransmitting the packets can be set, e.g. indirect proportional to the density of vehicles.

The present invention proposes a method for vehicle-to-vehicle multi-hop broadcast communication comprising the steps of:

determining a position data of a receiving vehicle, receiving position data comprising position from sending vehicles, calculating a relative position between the receiving vehicle and the sending vehicle, calculating a density of vehicles from the calculated relative positions, and/or periodically sending the position data of the receiving vehicle, wherein a time for periodically sending the position data of the receiving vehicle is set in accordance with information respecting vehicles, for example, the density of vehicles.

In the method a receiving process may be provided, comprising at least one of the steps of: receiving a data packet, determining from the data packet the number of data sets included in the data packet and/or repeating for the number of data sets the following steps: deciding if the data set is received for the first time by comparing a pair of vehicle ID and timestamp of the data set with a vehicle data database, storing the data set in the vehicle data database upon the decision, determining a time to send according to the relative distance between the sending vehicle and the receiving vehicle, and/or sending the data set when time to send is reached and deleting the data set from the vehicle data database.

The present invention further proposes an apparatus for vehicle-to-vehicle broadcast communication comprising:

a position determining unit for determining position data of a receiving vehicle, a receiving unit for receiving position data from sending vehicles, a relative calculating unit for calculating a relative position between the receiving vehicle and each sending vehicle, a density calculating unit for calculating a density of vehicles from the calculated relative positions, and/or a sending unit for periodically sending the position data of the receiving vehicle, wherein the sending unit sets a time for periodically sending the position data of the receiving vehicle in accordance with information with respect to vehicles, for example, the density of vehicles.

The apparatus according to the present invention can be configured to carry out further steps of the method according to the present invention as described herein.

The position determining unit can comprise a global positioning system (GPS), a gyroscope, a compass, a gyrocompass, a pulse counter and/or a tachometer.

The receiving unit and the sending unit, summarized as communication unit can be WLAN, IEEE 802.11 family (802.11a-802.11p), IEEE 802.15, DSRC and/or Bluetooth and the respective protocol thereof. The protocols used may be IPv4 or IPv6 . The frequency bandwidth used by the communication unit can be 2.4 GHz and/or 5.9 GHz.

Further, as the above discussed safety applications require a larger communication range than the communication range defined in the above-mentioned protocols, the individual information is relayed by a relay node to arrive at a multi-hop communication. Each vehicle is a node in the ad-hoc network. Further, as all vehicles and/or nodes need the information, the packets containing the information can be broadcasted omnidirectionally. The above-mentioned unit can be connected to vehicles, traffic posts, traffic signs, traffic signals and/or landmarks. Therefore, the aforesaid traffic posts, traffic signs, traffic signals and landmarks are also nodes in the ad-hoc network.

The time for periodically sending the position data of the receiving vehicle can be set in accordance with the relative directions between the receiving vehicle and each sending vehicle. The relative direction between the vehicles indicates whether they travel in the same or in different directions.

The time for periodically sending the position data of the receiving vehicle may further be set in accordance with the velocity of the receiving vehicle and the relative velocities between the receiving vehicle and each sending vehicle.

The receiving vehicle can periodically retransmit the position data of the receiving vehicle and position data of the sending vehicles.

Accordingly, the time for periodical transmission can be set dynamically according to the traffic.

The time for periodically sending may be set to be inversely proportional to the density of vehicles, as an example.

The retransmitting of the position data of the receiving vehicle and position data of the sending vehicles can be stopped when the relative position between the receiving vehicle and the respective sending vehicle is larger than a predetermined threshold.

When the receiving vehicle receives position data from the same sending vehicle twice within a predetermined time, the receiving vehicle can decide upon the relative position to the sending vehicle about retransmitting the position data from the sending vehicle.

It is desirable that the last vehicle should still send out data packets in order to avoid a collision from behind. Since the calculated density is based on relative positions, it is possible to differentiate between local densities in front and behind the vehicle based on the calculated density and set the time for periodically sending in dependence of that.

The position data of the receiving vehicle and the position data of the sending vehicles are comprised in a data packet which at least comprises a number of data sets included in the data packet, i.e. an indication of how many data sets are comprised in the packet as well as the data sets. Each data set comprises at least a vehicle ID and a timestamp. The position data may be comprised in the form of a position vector. The position vector can be calculated on the basis of an actual position, an actual speed and/or an actual direction of the vehicle.

In summary, the present invention proposes a wireless vehicle-to-vehicle communication system and method for vehicle-to-vehicle multi-hop broadcast communication, in which the number of data packets that need to be transmitted to ensure provision of fast and reliable information on traffic conditions can be reduced by two ways, namely by detection of congestion and by so-called efficient flooding.

The above described features of the invention can be combined in any way as a whole or in part without departing from the scope of the disclosure of the invention.

These and other potential objects, features and advantages of the present invention will appear more fully form the following detailed description of preferred embodiments of the invention. It is to be understood, however, that the scope of the present invention is not limited to the given embodiments shown in the accompanying schematically drawings.

DETAILED DESCRIPTION OF THE INVENTION

Figure 1:
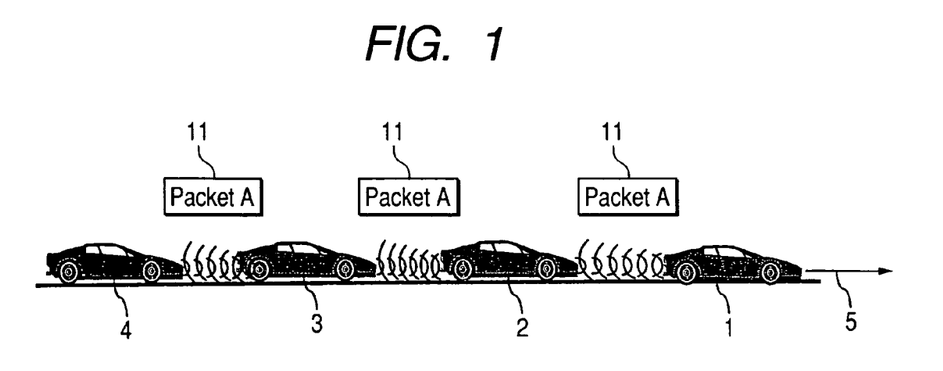
FIG. 1 shows schematically the general structure of congestion detection using an ad-hoc network.

FIG. 1 shows schematically the general structure of an ad-hoc wireless network comprising multiple vehicles. The first vehicle 1 sends out a packet 11. This packet 11 is received by the following vehicle 2. The following vehicle 2 retransmits the packet 11 to omni-directionally to both the first vehicle 1 and the next vehicle 3. The next vehicle 3 receives the packet 11 and retransmits the packet 11 omni-directionally to the prior vehicle 2 and to the last vehicle 4. Reference numeral 5 indicates the direction of vehicles 1 to 4.

Figure 2:
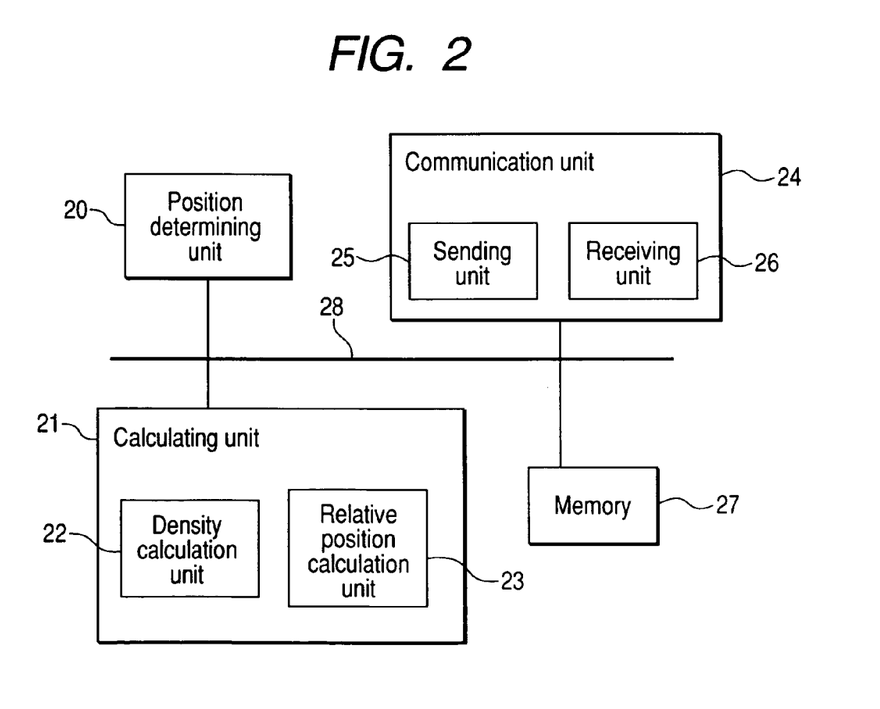
FIG. 2 shows schematically the apparatus for a vehicle-to-vehicle communication.

FIG. 2 shows schematically the apparatus for a vehicle-to-vehicle communication. The apparatus comprises a position determining unit 20, a calculation unit 21, a communication unit 24 and a memory unit 27. The calculation unit 21 further comprises a density calculation unit 22 and a relative velocity calculation unit 23. The communication unit 24 comprises further a sending unit 25 and a receiving unit 26. All units are connected by a bus 28. The above described apparatus can be realized in software, in hardware or in a combination thereof.

Figure 3:
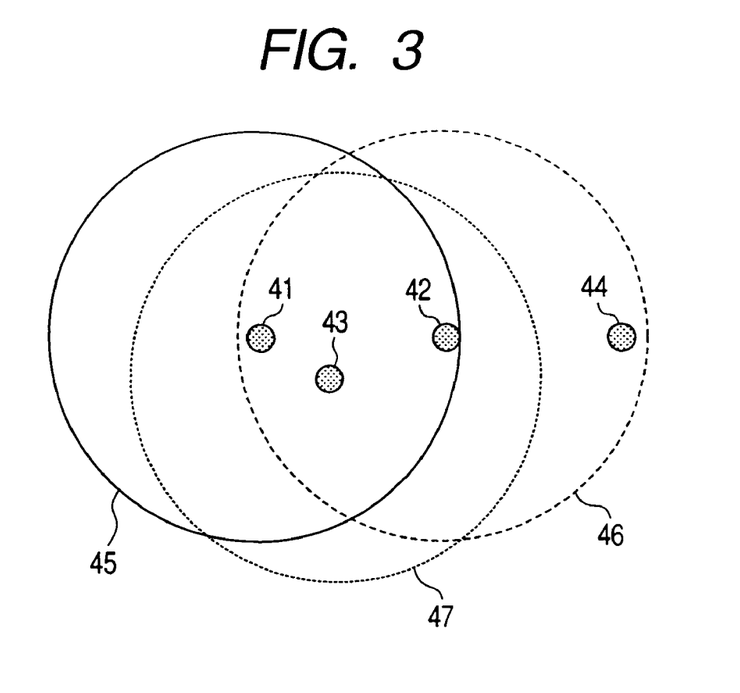
FIG. 3 shows schematically a way to flood information through an ad-hoc network.

FIG. 3 shows schematically the idea of efficient flooding. Efficient flooding is also directed to the reduction of the number of packets transmitted within the ad-hoc network. As mentioned above, the packet should be retransmitted to reach the communication range that the safety application requires. Mainly, efficient flooding provides a way to flood the packets through the wireless ad-hoc network efficiently by deciding at each vehicle/node if the packet shall be retransmitted or not.

In this Figure, reference numerals 41, 42, 43 and 44 denote vehicles/nodes. The reference numerals 45, 46 and 47 denote the communication range of vehicle 41, 42 and 43 respectively. In the case, the packet should be transmitted from vehicle 41 to vehicle 44 is most efficient if vehicle 42 retransmits the packet instead of vehicle 43. Accordingly, it is not necessary that vehicle 43 retransmits the packet at all. To make vehicle 42 retransmit the packet instead of vehicle 43, vehicle 42 has to send out the packet before vehicle 43. Further vehicle 43 has to recognize that there exists another vehicle in front of vehicle 43.

Such a recognition can be realized by the following algorithm. When the vehicles receive the position data, they calculate the distance form the sender. In this example, vehicles 42 and 43 calculate the distance from vehicle 41, based on the position information included in the packet. Next, the vehicles store this information in the memory unit 17 together with a time when the packet shall be sent out (Time-to-send). This Time-to-send is calculated based on the distance.

$$\text{Time-to-send} = [\text{current time}] + (-0.1/400)*d + 0.1 \qquad \text{Equation 1}$$

wherein d is the distance between the sending vehicle and the receiving vehicle. If the distance is more than the threshold, e.g. 400 m, Time-to-send is smaller than the current time, Time-to-send would be set empty.

In this example, as the distance between vehicles 41 and 42 is larger than the distance between vehicles 41 and 43, vehicle 42 sends out the packet prior vehicle 43. Accordingly, vehicle 43 receives the same packet before sending the packet. Therefore, vehicle 43 can delete the respective packet without sending out the same from a vehicle data base which will be described later.

Figure 4:
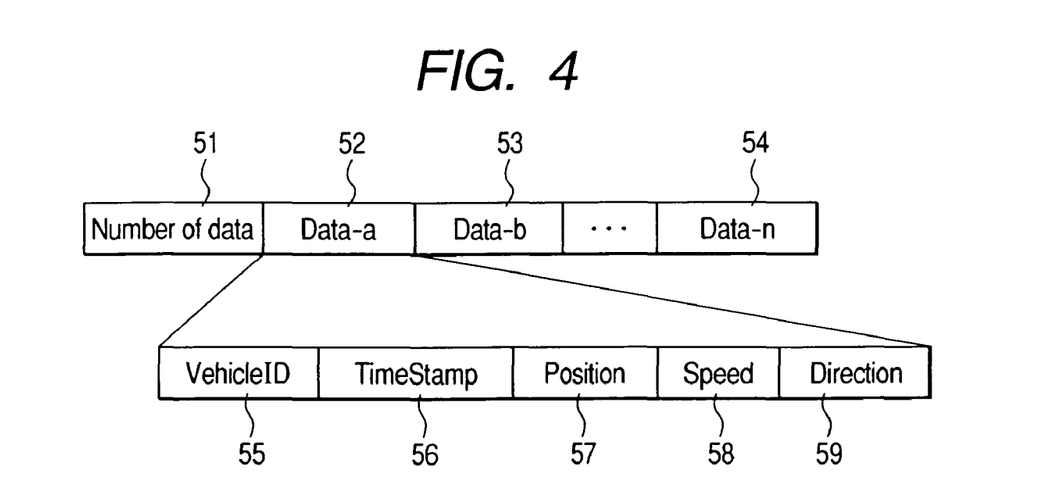
FIG. 4 shows the packet format of the vehicle data.

FIG. 4 shows the packet format of the vehicle data. In field 51 the number of data included in the packet is written. This number is an integer larger or equal 1. The following field data-a 52 is always the data corresponding to the sender which has emitted the packet. The subsequent fields, data-b 53 to data-n 54, are related to further vehicles/nodes in the ad-hoc network. Accordingly, if the sender does not have data to be retransmitted, there are only fields 51 and 52.

Each data field 52 to 54 includes sub-fields such as Vehicle ID 55, Timestamp 56, Position 57, Speed 58 and Direction 59. Vehicle ID 55 is an arbitrary ID which can uniquely identify the vehicle. Timestamp 56 is the time the data was sent out from the original sender. Position 57 is the position data of the vehicle identified by Vehicle ID, which can be written by terrestrial longitude and latitude. Speed 58 is the speed of the original sender and direction 59 is the direction of the original sender.

Figure 5:
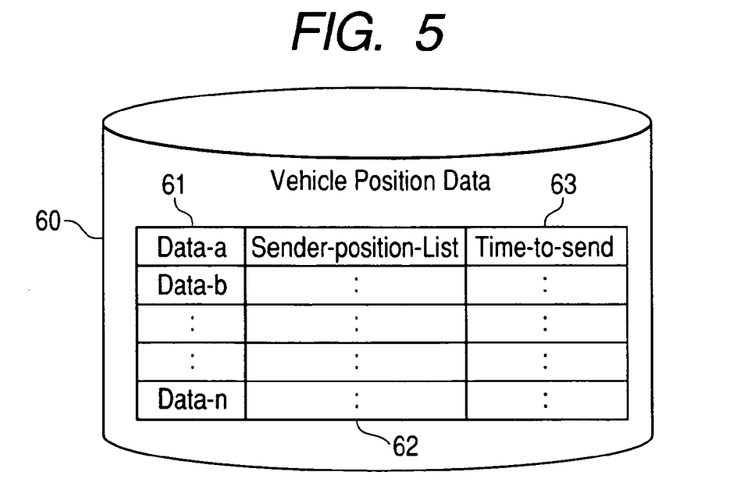
FIG. 5 shows schematically the vehicle position database.

FIG. 5 shows schematically the vehicle position database 60 provided in the memory unit 27. In column 61 the vehicle data as defined in the FIG. 4 is stored. In column 62 the sender-position-list is stored and in column 63 the calculated Time-to-send is stored. The sender-position-list defines the relative position between the vehicle and the other vehicles.

Figure 7:
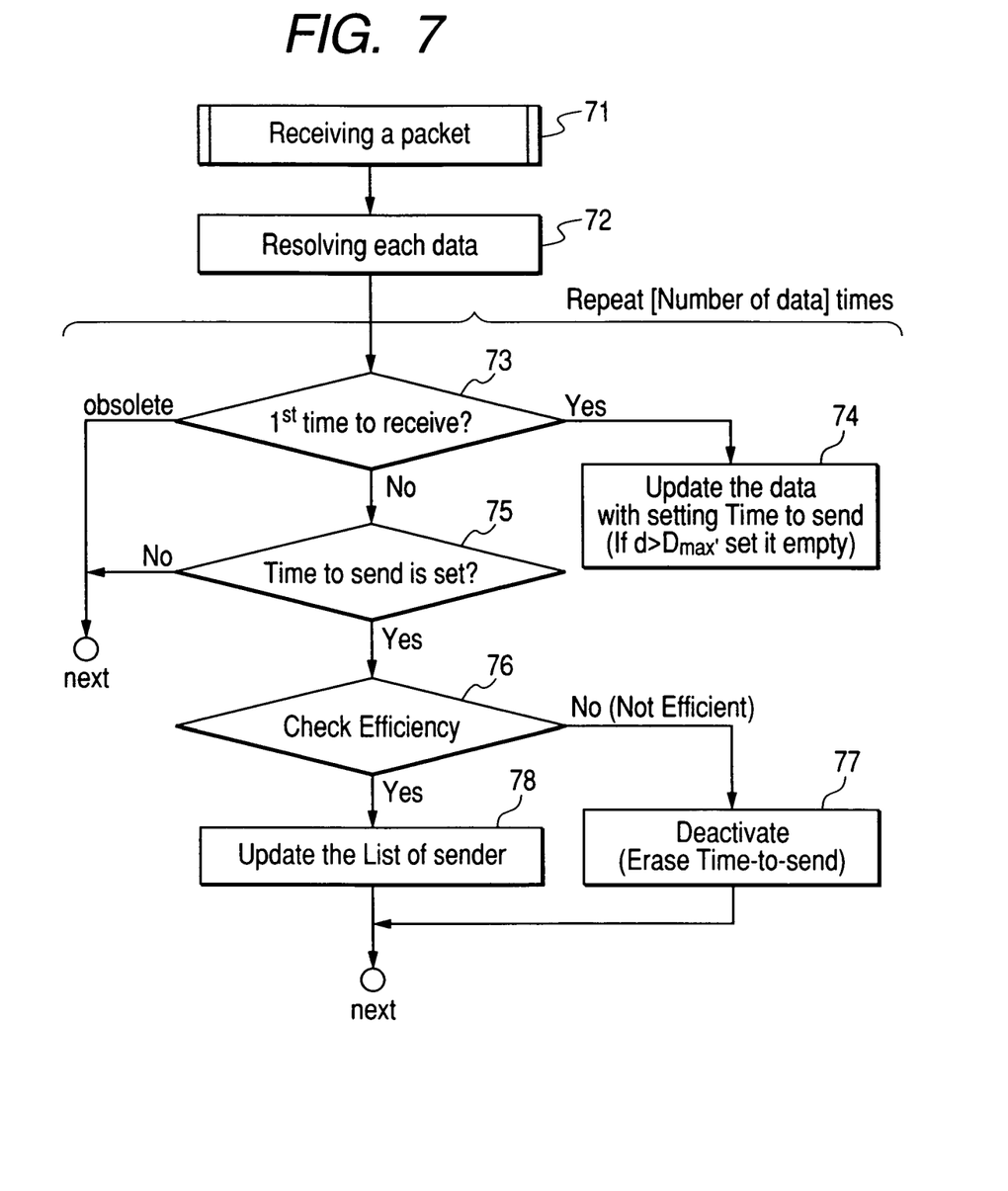
FIG. 7 shows a flowchart of a receiving process.

FIG. 7 shows a flowchart of a receiving process which is executed when the vehicle receives a packet in step 71. After receiving the packet, the packet is resolved into each data, namely data-a to data-n in step 72. The following sequence, steps 73 to 78 is repeated according to the number of vehicle data-a to data-n included in the packet.

Figure 6:
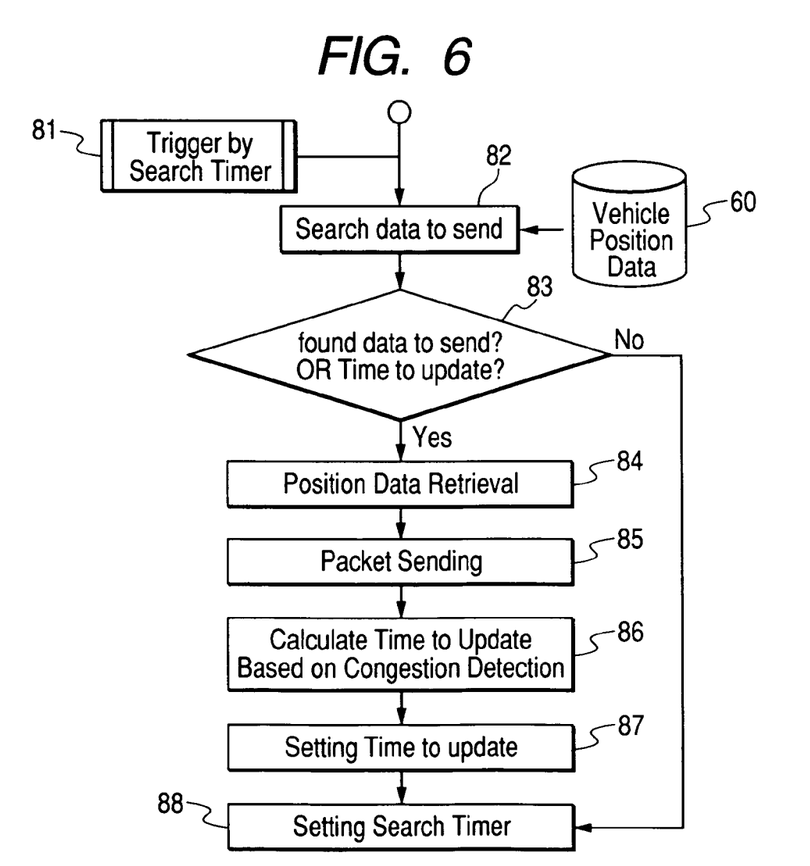
FIG. 6 shows a flowchart of a sending process.

FIG. 6 shows a flowchart of a sending process which sends out the packets continuously. This process is invoked by a search timer 81 which sets itself after start up. Every time the process is started, the process searches data in step 82 from the vehicle data base to transmit. If in step 83 data was found with a time-to-send close to the current time, this data is regarded to be sent. In step 84 position data of the vehicle is acquired and a data packet according to FIG. 5 is built. In step 85 the packet is sent. After sending the packet, in step 86 a time to update is calculated based on the congestion detection. If congestion is detected, the time to update is set to a larger value than the initial value in step 87. In step 88 the search timer 81 is set to the calculated update time. In the case in step 83 no data was found, the process continuous at step 88 and sets the search timer 81 to the initial value.

First, it is checked in step 73 if the vehicle data has been received for the first time or not. This decision is based on comparing the pair of Vehicle ID and Timestamp of the received data with the respective data in the vehicle database. If the data has been received for the first time, it is further checked if a difference between the Timestamp of the received data and the current time is larger than a predetermined effective time or not. If it is larger than the effective time, the received data is regarded as obsolete, and simply discarded.

If the data is first received but is not obsolete, the data is stored in the vehicle data database in step 74. The relative position of the sending vehicle is stored in the Sender-position List 62, and the sending time, which is calculated by the Equation 1 based on the distance between the sending vehicle and the receiving vehicle, is stored in the Tim-to-send 63. If the data is not first received and not obsolete, it is checked if a Time-to-send is set in step 75 or not. If not, the process proceeds with the next data at step 73. If a Time-to-send is set, efficient flooding is executed repeatedly for all vehicles listed in the sender-position-list in step 76, as set forth in connection with FIG. 4. In the case all vehicles in the sender-position-list are closer to the sender than the actual vehicle/node, the actual node has to retransmit the packet. Otherwise, efficient flooding is deactivated in step 77 and the time-to-send is erased in the vehicle data base. Next the list of sender in the vehicle data base is updated in step 78 and the process proceeds with the next data.

Features and specific details of the structure of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. A method for wireless communication between nodes including a node moving on a road comprising the steps of:
   obtaining a node data of the first node including a position, a velocity and a moving direction of the first node;
   receiving a node data of at least one second node including a position, a velocity and a moving direction from the at least one second node with using wireless communication;
   calculating at lease one relative position between the first node and the at least one second node based on the node data of the first node and the node data of the at least one second node;
   determining whether the road of the moving direction of the first node is congested or not, and a density of nodes when the road of the moving direction of the first node is congested, based on the node data of the at least one second node, the at least one relative position, the velocity of the first node, and the moving directions of the first node and the second node; and
   starting a sending process of the node data of the first node and/or the node data of the at least one second node with a frequency set to be decreased inversely proportional to the density of nodes.

2. The method according to claim 1,
   wherein the congestion determining step includes the steps of,
   calculating the density of nodes in the road of the moving direction of the first node, based on the at least one relative position, and the moving directions of the first node and at least one of the second nodes; and
   detecting a congestion based on the velocity of the first node, and the density of nodes in the road of the moving direction of the first node.

3. The method according to claim 1,
   wherein the determining step is executed when the first node receives a predetermined number of packets from the at least one second node going the same moving direction as the first node, the first node receives the packets from the at least one second node in front and the at least one second node behind, and the velocity of the first node is below a predetermined threshold.

4. The method according to claim 1,
   the method further comprising the steps of:
   stopping a retransmission of the node data of the second node, the relative position of which is larger than a predetermined threshold.

5. The method according to claim 1,
   wherein the first node has a node data database for storing the node data of the at least one second node to be transmitted, and
   wherein the node data of the at least one second node includes a node ID of a node from which the position, the velocity, and moving direction included in the node data are obtained, and a timestamp for indicating a sending time of the node data from the node having the node ID, the method further comprising the steps of:
   determining whether the node data that the second node obtains from a third node is one received first or not, with comparing the node ID and the timestamp of the node data stored in the node data database and the node ID and the timestamp of the node data which the second node obtains from the third node; and
   storing the node data, when the node data is determined one first received.

6. The method according to claim 5,
   the method further comprising the steps of:
   determining whether the node data is eliminated from the node data database or not, in accordance with the relative position of the third node which sent the node data stored in the node data database to the second node, and the relative position of the first node to the third node, when the node data is not one received first.

7. The method according to claim 6,
   the method further comprising the step of:
   renewing the node data obtained by the second node and stored in the node data database with the node data received from the third node when the elimination determining step decides that the node data is not eliminated.

8. An apparatus for wireless communication between nodes included in a first node, the apparatus comprising:
   a position determining unit for determining a node data of the first node including a position, a velocity and a moving direction of the first node;
   a receiving unit for receiving a node data of at least one second node including a position, a velocity and a moving direction from the at least one second node with using wireless communication;
   a calculating unit for calculating at least one relative position between the first node and the at least one second node based on the node data of the first node and the node data of the at least one second node, and determining whether the road of the moving direction of the first node is congested or not, and a density of nodes when the road of the moving direction of the first node is congested, based on the node data of the at least one second node, the at least one relative position, the velocity of the first node, and the moving directions of the first node and the second node; and
   a sending unit for starting a sending process of the node data of the first node and/or the node data of the at least one second node with a frequency set to be decreased inversely proportional to the density of nodes.

9. The apparatus according to claim 8,
   wherein the calculating unit determines whether the road of the moving direction of the first node is congested or not, with calculating the density of nodes in the road of the moving direction of the first node, based on the at least one relative position, and the moving directions of the first node and the at least one of second nodes, and detecting a congestion based on the velocity of the first node, and the density of nodes in the road of the moving direction of the first node.

10. The apparatus according to claim 8,
    wherein the calculating unit determines whether the road of the moving direction of the first node is congested or not, when the first node receives a predetermined number of packets from the at least one second node going the same moving direction as the first node, the first node receives the packets from the at least one second node in front and the at least one second node behind, and velocity of the first node is below a predetermined threshold.

11. The apparatus according to claim 8,
wherein the sending unit stops a retransmission of the node data of the second node, the relative position calculated of which is larger than a predetermined threshold.

12. The apparatus according to claim 8,
the apparatus further comprising:
a node data database for storing the node data of the at least one second node to be transmitted, the node data of the at least one second node including a node ID of a node from which the position, the velocity, and moving direction included in the node data are obtained, and a timestamp for indicating a sending time of the node data from the node having the node ID,
wherein the receiving unit receives the node data, determines whether the node data that the second node obtains from a third node is one received first or not, with comparing the node ID and the timestamp of the node data stored in the node data database and the node ID and the timestamp of the node data which the second node obtains from the third node, and stores the node data when the node data is determined one first received.

13. The apparatus according to claim 12,
wherein the receiving unit determines whether the node data is eliminated from the node data database or not, in accordance with a relative position of the node which sent the node data stored in the node data database to the second node, and the relative position of the first node to the third node, when the node data is not one received first.

14. The apparatus according to claim 13,
wherein the receiving unit renews the node data obtained by the second node and stored in the node data database with the node data received from the third node when the elimination determining step decides that the node data is not eliminated.

* * * * *